United States Patent
Bauer et al.

(10) Patent No.: US 10,071,799 B2
(45) Date of Patent: Sep. 11, 2018

(54) COOPERATIVE ACTUATOR SYSTEM FOR ACTIVE FLOW CONTROL

(71) Applicant: Airbus Defence and Space GmbH, Taufkirchen (DE)

(72) Inventors: Karin Bauer, Oberhaching (DE); Markus Blechschmidt, München (DE); Wolfgang Nitsche, Gollenberg (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 86 days.

(21) Appl. No.: 15/265,920

(22) Filed: Sep. 15, 2016

(65) Prior Publication Data

US 2017/0081022 A1    Mar. 23, 2017

(30) Foreign Application Priority Data

Sep. 17, 2015   (EP) ..................................... 15185707

(51) Int. Cl.
*B64C 23/00* (2006.01)
*B64C 23/06* (2006.01)
(Continued)

(52) U.S. Cl.
CPC ............ *B64C 23/005* (2013.01); *B64C 21/08* (2013.01); *B64C 23/06* (2013.01); *B64G 1/22* (2013.01); *G05B 19/0428* (2013.01); *B64C 2230/02* (2013.01); *B64C 2230/04* (2013.01); *B64C 2230/06* (2013.01); *B64C 2230/18* (2013.01);
(Continued)

(58) Field of Classification Search
CPC ....... B64C 23/005; B64C 23/06; B64C 21/08; B64C 2230/18; B64C 2230/02; B64C 2230/04; B64C 2230/06; B64G 1/22; G05B 19/0428; G05B 2219/45207; Y02T 50/166

See application file for complete search history.

(56) References Cited

U.S. PATENT DOCUMENTS

| 4,516,747 A | 5/1985 | Lurz |
| 8,991,768 B1 * | 3/2015 | Chase ....................... B64C 3/14 244/199.4 |
| 9,656,740 B2 * | 5/2017 | Golling ................... B64C 21/04 |

FOREIGN PATENT DOCUMENTS

EP    2650213 A1    10/2013

OTHER PUBLICATIONS

European Search Report, Extended European Search Report for European Patent Application No. 15185707 dated Mar. 2, 2016.

* cited by examiner

*Primary Examiner* — Mussa A Shaawat
*Assistant Examiner* — Michael V Kerrigan
(74) *Attorney, Agent, or Firm* — Lorenz & Kopf, LLP

(57) ABSTRACT

A cooperative actuator system for active flow control, a vehicle comprising such cooperative actuator system, and a method for operating an actuator system for active flow control. The cooperative actuator system includes actuators, a control unit, and a data unit. The actuators are distributed along the surface in at least a first group and a second group downstream of the first group. The control unit is configured to control the actuators of the first group so that they form a first flow structure along the surface. The data unit is configured to provide data of the first flow structure. The control unit is further configured to control the actuators of the second group based on the data of the first flow structure, (Continued)

so that the actuators of the second group cooperatively interact with the first flow structure to form a second flow structure along the surface.

15 Claims, 7 Drawing Sheets

(51) Int. Cl.
    *B64G 1/22*     (2006.01)
    *G05B 19/042*     (2006.01)
    *B64C 21/08*     (2006.01)

(52) U.S. Cl.
    CPC ... *G05B 2219/45207* (2013.01); *Y02T 50/166* (2013.01)

COOPERATIVE ACTUATOR SYSTEM FOR ACTIVE FLOW CONTROL

CROSS-REFERENCE TO RELATED APPLICATION

This application claims priority of European Patent Application No. 15185707.5 filed on Sep. 17, 2015, the disclosure of which application is herewith incorporated herein by reference in its entirety.

TECHNICAL FIELD

The embodiments described herein relate to a cooperative actuator system for an active flow control, an aircraft, automobile, vehicle or boat comprising such cooperative actuator system, and a method for operating an actuator system for an active flow control.

BACKGROUND

Flow bodies as parts of an aircraft, a vehicle or of another apparatus subjected to a surrounding flow are often required to show aerodynamic characteristics that result in a substantially fully attached flow in a variety of flow conditions. For example, commercial aircrafts are designed for wide flow velocity and altitude ranges. In boundary conditions, such as during high lift flight, it is possible to use active flow control systems for preventing flow separation from an aircraft wing or other surfaces. In comparison to conventional surfaces, active flow control can lead to an increased lift by eliminating separations, while holding the angle of attack constant, or by delaying the stall of a particular surface to higher degrees of flow incidence, consequently increasing the lift as well. This is expedient and advantageous especially for wings of an aircraft, vertical or horizontal tail planes or other control surfaces attached to a part of an aircraft.

It is known to employ fluidic actuators for influencing the flow along a flow surface of a flow body. These fluidic actuators may be realized in such a way that they provide a pulsed ejection from openings in the flow surfaces. This ejection is able to delay separations to higher flow incident angles by introducing vortical structures, which convect downstream of the flow element, thus energizing the otherwise separated flow area. By optimizing the pulsation frequency, the duty cycle and the momentum injection through the openings according to the local flow phenomena, a highly efficient active flow control system can be created. Usually, these fluidic actuators utilize valves or other active flow influencing means for the provision of the pulsed ejection flow.

EP 2 650 213 A1 discloses a flow body having a surface and a leading edge having an active flow control system, wherein the active flow control system comprises a plurality of openings, at least one control pressure varying device and at least one fluidic actuator with an interaction chamber having an inlet connectable to an air source, at least two outlets and at least two control pressure ports. The openings are distributed along or parallel to the leading edge in a side-by-side relationship and extend through the surface. The control pressure varying device is connected to the at least two control pressure ports in a fluidic manner, wherein the control pressure varying device is adapted to bring about the flow of the fluid into a respective one of the outlets. Each of the outlets is connected to one individual opening of the plurality of openings.

In addition, other aspects, desirable features and characteristics will become apparent from the subsequent summary and detailed description, and the appended claims, taken in conjunction with the accompanying drawings and this background.

SUMMARY

Hence, there may be a need to provide an improved cooperative actuator system, which either provides better performance and/or can be designed lighter.

Certain problems can be solved by the subject-matters of the independent claims, wherein further embodiments are incorporated in the dependent claims. It should be noted that the aspects of the embodiments described in the following apply also to the active flow control, the aircraft or the automobile comprising such cooperative actuator system, and the method for operating an actuator system for an active flow control.

According to embodiments of the present invention, a cooperative actuator system for an active flow control along a surface is presented. The cooperative actuator system comprises a plurality of actuators, a control unit, and a data unit. The plurality of actuators is configured to be distributed along the surface in at least a first group and a second group downstream of the first group. Of course, there are more than a first and a second group of actuators possible, e.g. a third group or a third and a fourth group. The control unit is configured to control the actuators of the first group so that they form a first flow structure along the surface. The data unit is configured to provide data of the first flow structure. The control unit is further configured to control the actuators of the second group based on the data of the first flow structure, so that the actuators of the second group cooperatively interact with the first flow structure to form a second flow structure along the surface.

The cooperative actuator system according to embodiments of the invention may lead to a reduction in energy/impulse/mass flow to be provided by the actuation system, a reduction in resources needed to operate the actuation system (pressure, energy, etc.), a reduction in weight, size and power of the actuation components as well as the entire system, a reduction in noise and structural loads generated by the actuation system and an increase in design space and enhanced performance of an aircraft or any other applications. Further, more types of actuation devices become eligible as the active components for a flow control task.

In an example, one actuator of the plurality of actuators is a single actuator or a group, e.g. a line of actuators. In an example, the first and/or second group is a row of actuators. The actuators may be arranged linear or curved. They may be arranged with similar or variable distances to each other. The actuators may be arranged as parallel rows or as diverting and expanding rows.

The control unit and/or the data unit may be a single device or a plurality of devices. The devices can be distributed along the surface.

In an example, the surface is part of an aircraft, a spacecraft, a vehicle or a boat. The surface may be a wing, a horizontal or vertical tail plane of an aircraft, a wing or a rotator of a wind turbine, a fuselage component of a vehicle, or any other body that is subjected to a surrounding flow. The surface may provide a geometrical delimitation and may define aerodynamic characteristics that may necessitate an active flow control during a certain operation state.

The cooperative actuator system according to embodiments of the invention may be used e.g. in local flow "repair" separation control, in an outer wing area, an ultra high bypass ratio (UHBR) engine integration, for an increase in rudder efficiency (e.g. Vertical Tail Plane, Horizontal Tail Plane or any control plane) and the like.

In an example, the first flow structure is a coherent flow structure or at least a natural or an artificial flow-bound vortex or vortex system formed by the actuators. In an example, the second flow structure effects a stabilization, an amplification, an attenuation and/or a displacement of the first flow structure to strengthen the coherent structure of the first flow structure. In another example, the second flow structure effects an annihilation of the first flow structure to weaken or eliminate the coherent structure of the first flow structure or of another incoming flow structure. If there are more than a first and a second group of actuators, e.g. a third group or a third and a fourth group, the subsequent group(s) of actuators may work together interactively, e.g. like cascades, to improve the effect of the preceding group(s) of actuators. This stabilization, amplification, attenuation, displacement or annihilation may be the cooperative interaction with the first flow structure. This stabilization, amplification, attenuation, displacement or annihilation may be used for separation control, drag reduction and/or transition control. The cooperative interaction means that the second flow structure is correlated to the first flow structure. In other words, the second flow structure has a constructive effect on the first flow structure to control the flow. In an example, the first and second flow structures are coherent structures which solve a determined active flow control task. The cooperative interaction may provide a space-time structure in the flow which may propagate downstream along the surface relative to an external medium, as e.g. air.

In an example, the data unit receives the data of the first flow structure from a database having stored the data of the first flow structure or a sensor unit monitoring the first flow structure. The database may be a flight data computer. The stored data, e.g. possible flow conditions, may be measured before. The sensor unit may be a single device or a plurality of devices. The devices can be distributed along the surface. In an example, the data of the first flow structure comprises a position, a propagation velocity and/or a propagation direction of the first flow structure.

When the data unit receives the data of the first flow structure from the sensor unit monitoring the first flow structure, a cooperative sensor-actuator system for active flow control is provided. Therein, the control unit controls the actuators of the first group so that they form a first flow structure along the surface. The sensor unit provides data of the first flow structure. The control unit controls the actuators of the second group based on the data provided by the sensor unit, so that the actuators of the second group cooperatively interact with the first flow structure to form a second flow structure along the surface. As a result, a separation control, drag reduction and/or transition control is achieved.

In an example, the data of the first flow structure are based on a flow measurement at the surface and/or in a boundary layer along the surface. The data of the first flow structure may be based on a visualization of the flow.

In an example, the sensor unit comprises a MEMS sensor, a pressure sensor, a temperature sensor, a hot film sensor, a hot wire sensor and/or combinations thereof. In an example, the sensor unit is configured to detect a pressure recovery and/or a drag reduction. In an example, the sensor unit is configured to detect an actuator chamber pressure.

In an example, the control unit is configured to control the plurality of actuators and/or sensors electrically, thermally and/or magnetically.

In an example, at least one actuator of the plurality of actuators, one control unit and one data unit form an actuation array, wherein several actuation arrays are controlled by an at least partially autonomous control mechanism. The actuation array may also comprise one sensor unit. This actuation array may be part of a system of tiles formed by e.g. one or more actuators and one or more sensor units and a local control unit, or with an autonomous or partially autonomous controlling mechanism which controls an output in regard to coherent structures in the flow and the flow conditions. The partially autonomous control mechanism can be based on local cooperative approaches such as swarm intelligence etc. Large system of tiles can be built of many different, similar or identical tiles. The cooperative effect of the actuation is then reflected in the cooperative behavior of the tile system.

According to embodiments of the present invention, also an aircraft or a vehicle is presented. The aircraft, vehicle, boat or automobile comprises a surface and a cooperative actuator system as described above for active flow control along the surface. The active flow control system may comprise a plurality of openings that extend through the surface. By generating a pulsating flow of air through the openings by means of a fluidic actuator, the surrounding flow at the openings and downstream thereof may be influenced. In influencing the local flow by means of introducing air into or sucking off air off a region of interest, a flow separation is eliminated or at least reduced.

According to embodiments of the present invention, also a method for operating an actuator system for active flow control along a surface is presented. It comprises the following steps, not necessarily in this order:

providing a plurality of actuators distributed along the surface in at least a first group and a second group downstream of the first group, controlling the actuators of the first group so that they form a first flow structure along the surface, providing data of the first flow structure, and controlling the actuators of the second group based on the data of the first flow structure, so that the actuators of the second group cooperatively interact with the first flow structure to form a second flow structure along the surface.

It shall be understood that the active flow control, the aircraft, vehicle, boat or automobile comprising such cooperative actuator system, and the method for operating an actuator system for active flow control according to the independent claims have similar and/or identical preferred embodiments, in particular, as defined in the dependent claims. It shall be understood further that a preferred embodiment of the invention can also be any combination of the dependent claims with the respective independent claim.

These and other aspects of the disclosed subject matter will become apparent from and be elucidated with reference to the embodiments described hereinafter.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
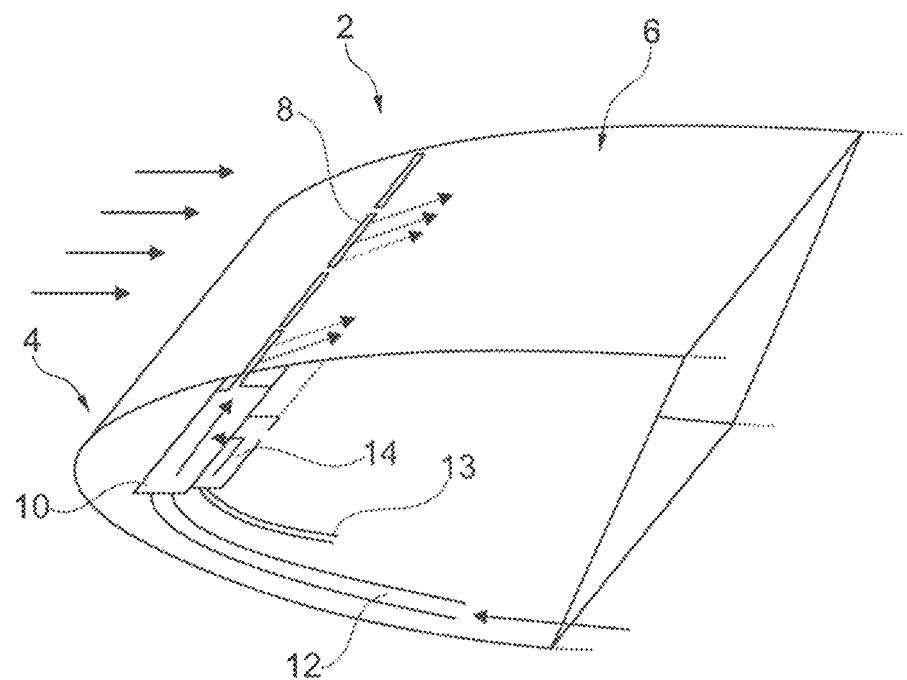
FIG. 1 shows schematically and exemplarily a surface of a flow body with fluidic actuators and a control pressure varying device in a three-dimensional view.

FIG. 1 shows schematically and exemplarily a flow body 2 in the form of a wing of an aircraft in a three-dimensional, sectional view. The flow body 2 has a leading edge 4 and a surface 6, wherein a plurality of openings in the form of adjacently located slits 8 is arranged in the surface 6. The slits 8 are connected to an array of fluidic actuators 10 that are adapted for providing a pulsed air flow from an air source 12 for influencing a surrounding flow through the control by a control pressure varying device 14. The fluidic actuators 10 are arranged in a linear extension of the slits 8 and therefore are connected to the slits 8 as directly as possible. The fluidic actuators 10 and the control pressure varying device 14 are arranged in a staggered manner and create two levels under the surface 6 on the inside of the flow body 2.

The slits 8 are arranged substantially parallel to the leading edge 4 and preferably span along the whole extension of the flow body 2. Thereby, a region of interest, where flow separation may take place, may be influenced such that a flow separation on the whole flow body 2 can be suppressed. By the ejection of a pulsed air flow into the surrounding flow around the flow body 2, the flow separation is prevented or separated flow will be reattached to the surface 6. The flow body 2 further comprises a main air source 12 and a control air source 13, the latter of which is connected to the pressure control device 14 controlling the pulsating operation of the fluidic actuators 10. The fluidic actuators 10 furthermore do not rely on moveable parts for the generation of air flow pulses as explained further below.

Figure 2:
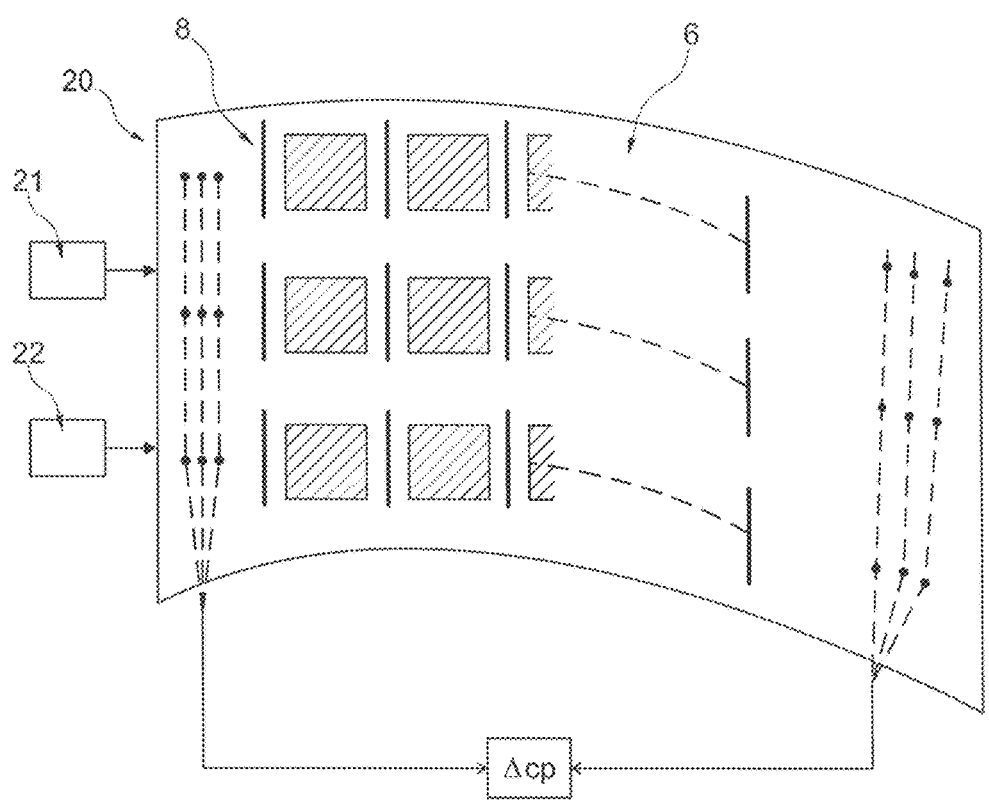
FIG. 2 shows schematically and exemplarily a cooperative actuator system for active flow control along a surface.

FIG. 2 shows schematically and exemplarily a cooperative actuator system 20 for active flow control along a surface 6. The cooperative actuator system 20 comprises a plurality of actuators (arranged below openings 8), a control unit 21, and a data unit 22. The plurality of actuators is distributed along the surface 6 in a first group, a second group and maybe n further groups downstream of the first group. The control unit 21 controls the actuators of the first group so that they form a first flow structure along the surface 6. The data unit 22 provides data of the first flow structure. The control unit 21 further controls the actuators of the second group based on the data of the first flow structure, so that the actuators of the second group cooperatively interact with the first flow structure to form a second flow structure along the surface 6.

The actuators of the plurality of actuators are here a line of actuators. The first and second group is a row of actuators. The data unit 22 receives the data of the first flow structure from sensor units monitoring the first flow structure. The sensor unit is here a plurality of sensor devices distributed along the surface 6. The sensor devices are here arranged as diverting rows.

This cooperative actuator system 20 aims at reducing a fluidic impulse needed by pulsed actuation systems to reattach separated flow based on a cooperative action of multiple rows of actuators positioned downstream of each other. The fluidic rows can be actuated such that the coherent flow structures (vortices) they produce are strengthened and stabilized by subsequent actuator rows while they propagate downstream. For example, a maximum reduction of 67% in total actuation momentum of the system may be achieved compared to a system comprising a single row of actuators to perform the same task. Authority requirements on a single actuator device can be reduced and much lighter and smaller actuation devices are needed. In the same time, a mass flow reduction for the overall system can be observed. Consequently, much smaller and lighter actuation and supply systems can be used to solve a flow control task.

The actuator system may be constructed and operated such as to enhance/maximize the efficiency of a flow control mechanism. To do so, a sensor array must be able to measure a propagation velocity of induced vortices by means of their footprints left on the surface. This can be done, for example, by analyzing the incoming signals of hotfilm or microstructured/nanostructured hotfilm/hotwire sensors, pressure transducers or other MEMS (microelectromechanical systems) sensors applied and by using algorithms like e.g. cross correlation. The optimal phase shift theta can then be computed with the following formulas:

$$\Theta = \frac{d_{act} \cdot f \cdot 360°}{u_{conv}} - \Delta\varphi$$

$$\Theta = \frac{d_{act} \cdot f \cdot T}{u_{conv}} - \Delta t$$

$\Theta$=Phase shift in degree or in seconds (as time in the period of the actuator)

$d_{act}$=Distance of actuators downstream $\Delta\varphi, \Delta t$=small advancement to adjust phase shift in degree or seconds f=Frequency T=Time in seconds of one period $u_{conv}$=Propergation velocity For optimised phase shift $\Theta$, the second vortex should not be induced if the first vortex is exactly above the following (consecutive) actuator opening downstream. Therefore, the time $\Delta t$ or phase $\Delta\varphi$, which the vortex from the consecutive actuator needs to be entirely developed, must be taken into account. Therefore, the phase shift $\Theta$ has to be adjusted by a small advancement $\Delta\varphi$ or $\Delta t$.

For swept wings, additional adjustments have to be done. One can either sweep the position of the actuators in a way that they are oriented perpendicular to the incoming flow or expand the sensor field to measure bidirectional surface velocity by e.g. 2D hotfilm sensor arrays. Then, one can measure both the local propagation velocity and the direction of propagation. Having measured the direction of the flow, the phase shift can be adjusted in such a way that the subsequent actuator in the determined propagation direction is used to enhance the flow control mechanism (via enhancement of responsible coherent structures downstream).

To control the efficiency of the flow control application, the pressure recovery can be analysed. The pressure recovery can be measured with pressure transducers in front and behind the actuator array. Additionally, the pressure of the actuator chamber should be measured to check the functionality of the single actuator, so that in a case of failure, the flow control state can be maintained by increasing the amplitude of the actuator(s) near or in the vicinity and downstream of the defective one.

Figure 3:
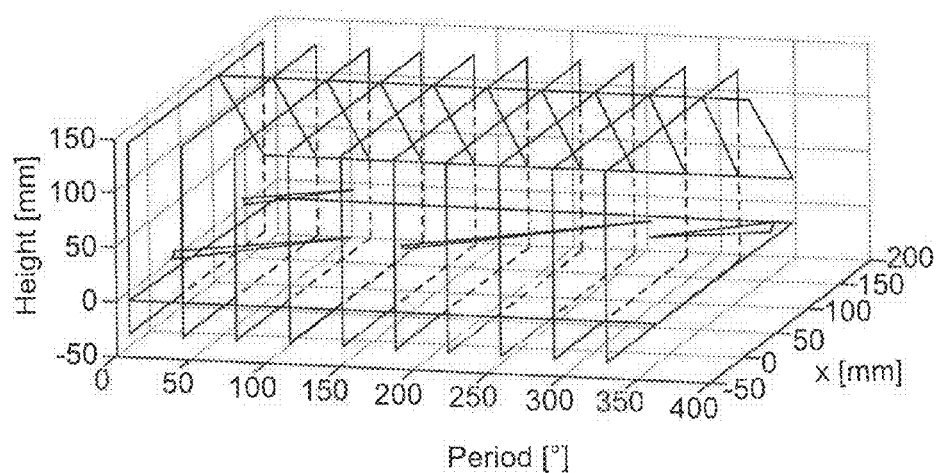
FIG. 3 shows flow fields with isosurfaces of vortices.
Figure 4:
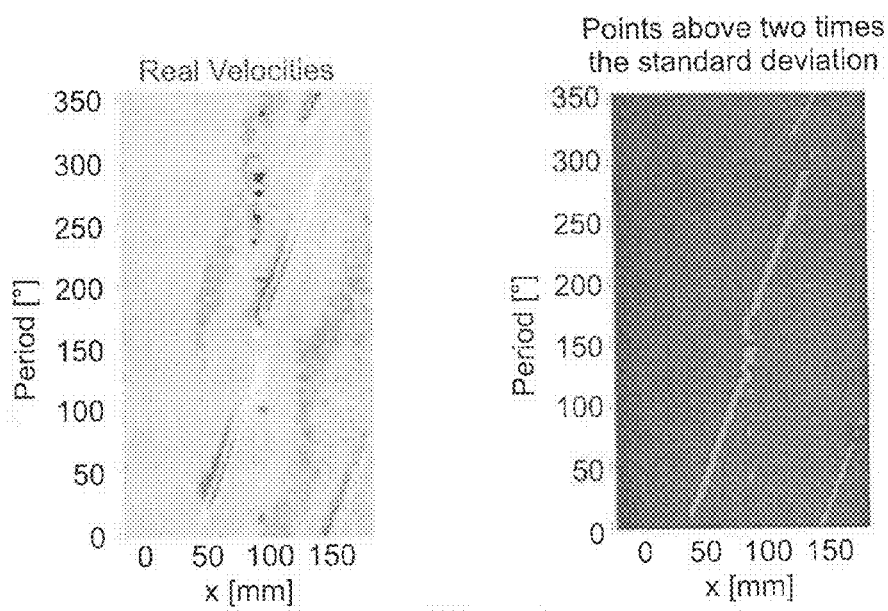
FIG. 4 shows real normal velocities of deconstructive phase shift (left) and velocities larger two times a standard deviation for same phase shift (right).

The interactions of the vortices can be illustrated and studied with e.g. two methods described below. First, one can look at normal velocities of a flow field over a period Φ. FIG. 3 shows flow fields with isosurfaces of vortices. In FIG. 3, the flow field for every time step gives an overview on the evolution/development and propagation of vortices. At a certain height above a wall, the velocities within the vortices can be extracted. The result is shown on the left side of FIG. 4. FIG. 4 shows real normal velocities of deconstructive phase shift (left) and velocities larger two times a standard deviation for same phase shift (right). Furthermore, the normal velocities relevant for vortex propagation are identified by selecting only the normal velocities larger than two times the standard deviation in the normal velocity distribution (right side of FIG. 4).

Figure 5:
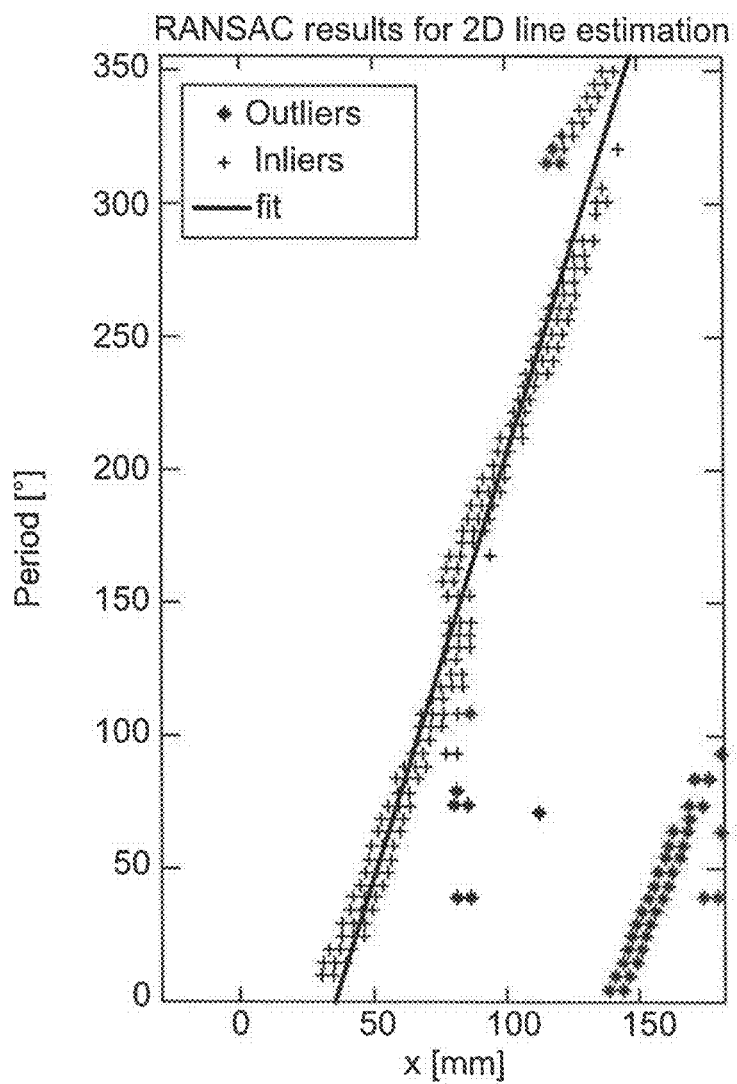
FIG. 5 shows an outcome of an algorithm with fitted line.

Since data was recorded with a phase averaging setup, artifacts occur as seen in the lower right edges in FIG. 4. To find the right measure for the alignment of the vortices these artifacts must be identified and discarded. This can be done with a common computer vision algorithm. The algorithm for data analysis adjusts the amount of data by iteratively applying three steps:
1. Selecting random measurement values
2. Calculating the model parameters
3. Determination of the support In each iteration, the measurement values which are supporting the model are stored. This is called consensus set. From the largest consensus set the solution is computed with a least square algorithm. Therefore, only the relevant data to build a model, in this case a linear fit are selected (see FIG. 5). FIG. 5 shows the outcome of the algorithm with fitted line. Furthermore, the displacement of the inliers to the fitted line is calculated. Assuming that a constructive interaction of vortices is leading to the best alignment and therefore to the minimum displacement, all measured phase shifts Θ within the campaign are taken into account. Moreover, to validate the results ten layers of normal velocities throughout the vortices are analyzed with this algorithm for every phase shift.

Figure 6:
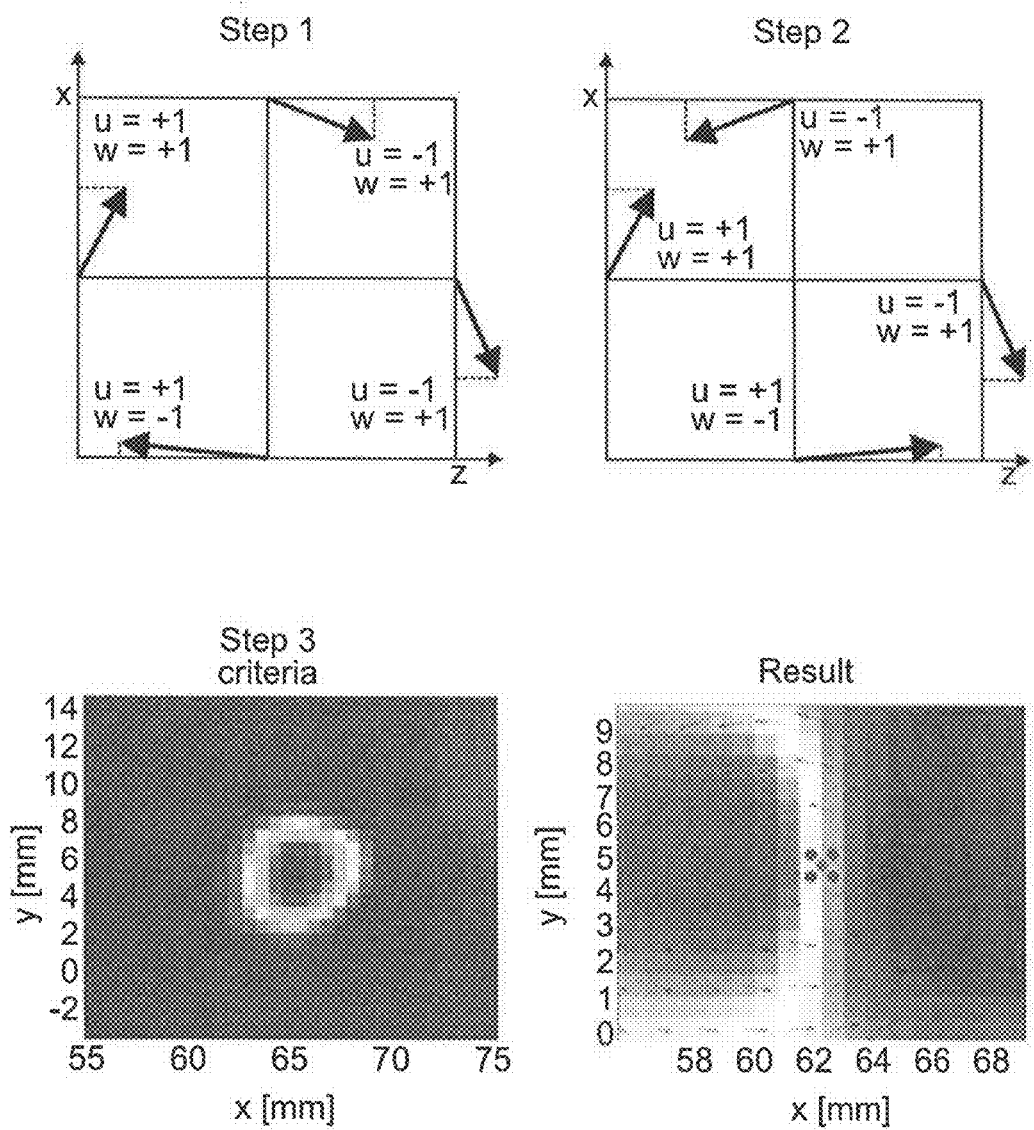
FIG. 6 shows detection (Step 1), validation with shear criterion (Step 2), validation with λ2-criteria (Step 3) and results obtained with the clustering algorithm mean-shift (Result).

The second method is to detect and track vortices over time to obtain parameters like propagation velocity, direction and strength in every frame. To detect the core of a vortex, a simple but effective method was used, looking at a signum of the velocities at every point of the flow field and check the λ2-criteria. This is summarized in these three points (see FIG. 6). FIG. 6 shows detection (Step 1), validation with shear criterion (Step 2), validation with λ2-criteria (Step 3) and result obtained with the clustering algorithm mean-shift (Result).
1. Four neighbors of each point of the flow field are selected. Only the signum value (sign) of the relevant velocity component is considered. If the sum of the signum values is zero, a vortex center is likely present. (Step 1)
2. To validate the vortex center the direction of the velocity components have to be in the right order. If $sig(u_{left})+sign(w_{up})=0$, it is likely to be shear and not a vortical motion. In this case the point is to be discarded. (Step 2)
3. Moreover, the detected vortex center is checked again with the λ2-criteria. If the point is negative in the λ2-field, a vortex center is present. (Step 3)

These steps are applied for the whole flow field and every time step. Since more points within a vortex fit these criteria and more vortices are detected in one time frame, the mean shift algorithm was implemented to automatically detect the true center of the vortices. One result is shown in the lower right edge of FIG. 6.

Figure 7:
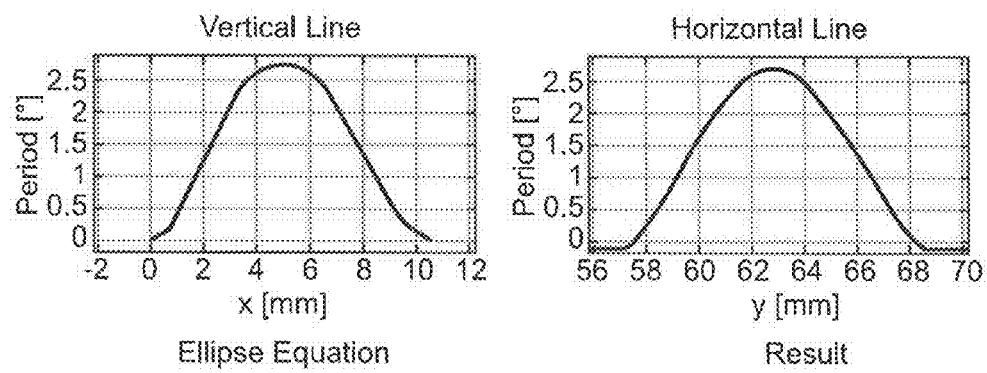
FIG. 7 shows a vertical (upper left) and horizontal (upper right) line to evaluate the effective radius with the elliptic equation (lower left) and the resulting radius drawn with the detected core (lower right).
Figure 7:
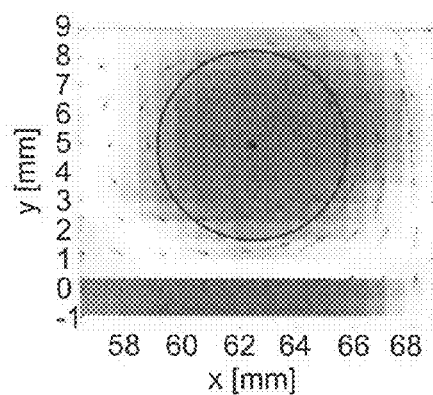

Once the vortex center is detected, the effective radius of the vortex can be calculated, assuming that a bigger vortex has more impact on entrainment across shear layer. The radius is obtained by means of the vorticity field. In general, vortices are created due to conservation of angular momentum and not necessarily assume an easily detectable circular shape, especially if several vortices interact with each other. Therefore the radius is calculated with the ellipse equation. To calculate the two radii a vertical line and a horizontal line is drawn through the vortex core and the vorticity of these lines is obtained as shown in the upper two images of FIG. 7. The vorticity field is very susceptible to noise, therefore vorticity less than 67% of the core vorticity is neglected. The so computed radius is called effective radius and an example is shown in the lower right corner of FIG. 7. FIG. 7 shows a vertical (upper left) and horizontal (upper right) line to evaluate the effective radius with the elliptic equation (lower left) and the resulting radius drawn with the detected core (lower right). A tracking of the vortices is also divided into three steps.
1. A search radius is put around the detected vortex core in the current frame.
2. In the following frame, all detected vortex cores are checked whether it is in the radius or not.
3. For vortex cores within the radius, the direction of the vorticity must be the same as before.

Figure 8:
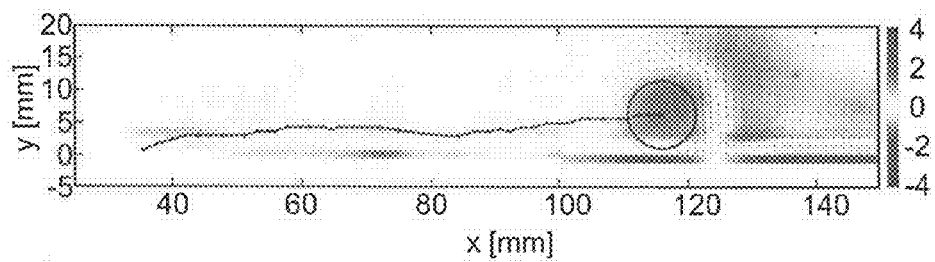
FIG. 8 shows vorticity and fluctuation velocity of a flow field with tracked path and effective radius of vortices induced.

This is done for every time frame and each detected vortex as shown in FIG. 8. FIG. 8 shows vorticity and fluctuation velocity of a flow field with tracked path and effective radius of vortices induced. With this information the propagation velocity, direction, size and strength of the vortex can be calculated. These quantities can then be used to rate the interaction process.

For separation detection, it is necessary to investigate a behavior of cooperating actuation on the total momentum coefficient. The total momentum coefficient is assumed to be reduced by using the mechanism of reattachment. Therefore, a flow state has to be recognized. The pressure recovery is a simple but effective way to evaluate the flow state in terms of attachment of the flow. The pressure recovery is a function of the step angle and is stated by the Δcp-value. The pressure coefficient is calculated with the formula:

$$c_p = \frac{p_x - p_{stat}}{q_\infty}$$

The out coming voltage of the differential pressure transducer used corresponds to the pressure difference. The stagnation pressure q∞ was measured separately with a Prandtl tube. To achieve Δcp, two differential pressure transducers where placed before and behind the diffuser step, taking care not to be in the local separation bubble at the bottom of the diffuser step, but inside the pressure induced separation region. For the attached flow, the pressure recovery is maximized.

The mechanism of separation control by cooperative action of several rows of actuators downstream proved successful. The phase shift is identified as a main parameter in this process. Further, using pressure recovery as an indicator of reattachment, it is shown that the total momentum coefficient can be reduced compared with a single row active for reattaching the flow. It is shown that the enhancement of the mechanism of reattachment and maintaining the attached flow with a lower momentum coefficient is achieved by cooperative actuation. An embodiment of the invention offers the opportunity to reduce the overall momentum and mass flow without any penalty in achieving the flow control task. Such optimized system would be beneficial on any separation controlled part of an aircraft or else in industrial application. The use of cooperative actuation also permits a spanwise segmentation of an actuation system into downstream columns, which then becomes adaptable to a 3 D configuration. Each of the spanwise segments can then be designed and operated to their own cooperative actuation. Furthermore, the parameters affecting the flow can be optimized.

Figure 9:
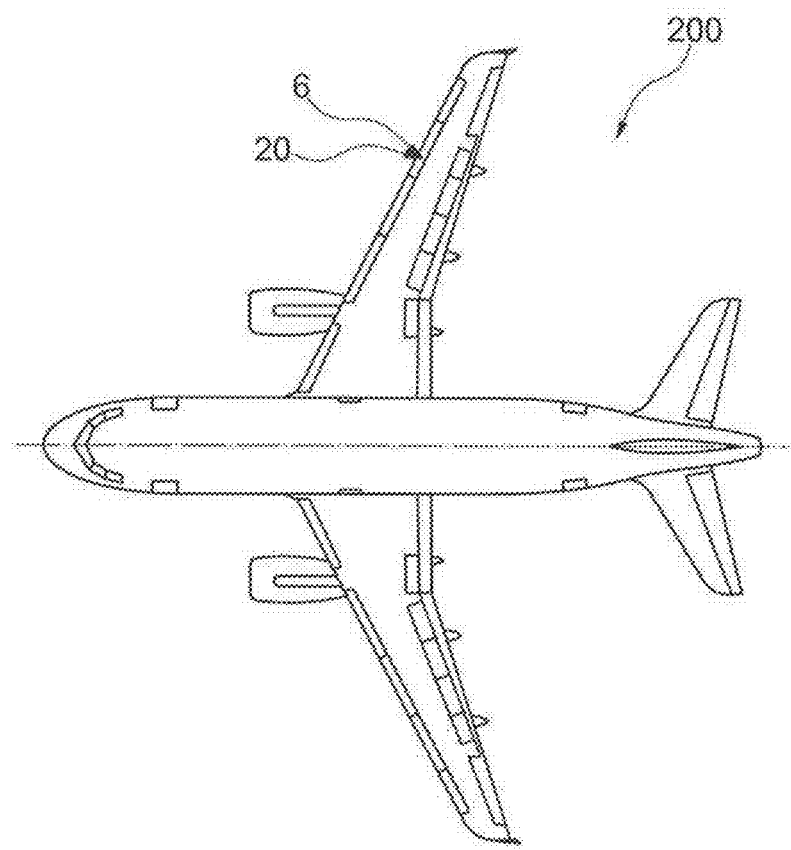
FIG. 9 shows an aircraft according to embodiments of the invention.

FIG. 9 shows an aircraft 200 according to an embodiment of the invention. The aircraft 200 comprises a surface 6 and a cooperative actuator system 20 as described above for active flow control along the surface 6.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A cooperative actuator system for active flow control along a surface, comprising:
   a plurality of actuators;
   a control unit; and
   a data unit;
   wherein the plurality of actuators are configured to be distributed along the surface in at least a first group and a second group downstream of the first group,
   wherein the control unit is configured to control the actuators of the first group so that they form a first flow structure along the surface,
   wherein the data unit is configured to provide data of the first flow structure,
   wherein the control unit is further configured to control the actuators of the second group based on the data of the first flow structure, so that the actuators of the second group cooperatively interact with the first flow structure to form a second flow structure along the surface, and
   wherein the plurality of actuators are fluidic actuators configured to influence the first flow structure and the second flow structure by introducing air into or sucking air off a surrounding flow.

2. The cooperative actuator system according to claim 1, wherein the data unit receives the data of the first flow structure from a database having stored the data of the first flow structure or a sensor unit monitoring the first flow structure.

3. The cooperative actuator system according to claim 2, wherein the sensor unit comprises a MEMS sensor, a pressure sensor, a temperature sensor, a hot film sensor, a hot wire sensor and/or combinations thereof.

4. The cooperative actuator system according to claim 2, wherein the sensor unit is configured to detect a pressure recovery and/or a resistance reduction.

5. The cooperative actuator system according to claim 2, wherein the sensor unit is configured to detect an actuator chamber pressure.

6. The cooperative actuator system according to claim 1, wherein the first flow structure is a coherent flow structure or at least a natural or an artificial flow-bound vortex or vortex system formed by the actuators.

7. The cooperative actuator system according to claim 1, wherein the second flow structure effects a stabilization, an amplification, an attenuation, a displacement of the first flow structure or an annihilation of the first flow structure or of another incoming flow structure.

8. The cooperative actuator system according to claim 1, wherein the first and/or the second group is a row of actuators.

9. The cooperative actuator system according to claim 1, wherein the data of the first flow structure comprises a position, a propagation velocity and/or a propagation direction of the first flow structure.

10. The cooperative actuator system according to claim 1, wherein the data of the first flow structure are based on a flow measurement at the surface and/or in a boundary layer along the surface.

11. The cooperative actuator system according to claim 1, wherein the control unit is configured to control the plurality of actuators electrically, thermally and/or magnetically.

12. The cooperative actuator system according to claim 1, wherein at least one actuator of the plurality of actuators, one control unit and one data unit form an actuation array, and wherein several actuation arrays are controlled by an at least partially autonomous control mechanism.

13. The cooperative actuator system according to claim 1, wherein the surface is part of an aircraft, a spacecraft, a vehicle or a boat.

14. A vehicle, comprising:
   a surface; and
   a cooperative actuator system according to claim 1 for active flow control along the surface.

15. A method for operating an actuator system for active flow control along a surface, comprising the steps of:
   providing a plurality of actuators distributed along the surface in at least a first group and a second group downstream of the first group, controlling the actuators of the first group so that they form a first flow structure along the surface, providing data of the first flow structure, and controlling the actuators of the second group based on the data of the first flow structure, so that the actuators of the second group cooperatively interact with the first flow structure to form a second flow structure along the surface, wherein the plurality of actuators are fluidic actuators configured to influence the first flow structure and the second flow structure by introducing air into or sucking air off a surrounding flow.

* * * * *